(12) United States Patent
Büttner et al.

(10) Patent No.: US 7,478,332 B2
(45) Date of Patent: Jan. 13, 2009

(54) SYSTEM FOR AND METHOD OF PROVIDING A USER INTERFACE FOR A COMPUTER-BASED SOFTWARE APPLICATION

(75) Inventors: Karl Büttner, Sudbury, MA (US); Erich E. Orenchuk, Cambridge, MA (US); Rakesh Shukla, Needham, MA (US)

(73) Assignee: 170 Systems Inc., Bedford, MA (US)

( * ) Notice: Subject to any disclaimer, the term of this patent is extended or adjusted under 35 U.S.C. 154(b) by 48 days.

(21) Appl. No.: 11/805,857

(22) Filed: May 24, 2007

(65) Prior Publication Data

US 2008/0005678 A1 Jan. 3, 2008

Related U.S. Application Data

(60) Provisional application No. 60/802,970, filed on May 24, 2006.

(51) Int. Cl.
*G06F 17/00* (2006.01)
(52) U.S. Cl. ........................................ 715/748; 715/760
(58) Field of Classification Search ......... 715/817–820, 715/712, 730–732, 741–743, 744–747, 748–749, 715/760, 762–763, 859, 863, 802, 805; 707/1, 707/10; 705/1, 80; 717/108, 100; 719/328–332
See application file for complete search history.

(56) References Cited

U.S. PATENT DOCUMENTS

| | | | |
|---|---|---|---|
| 7,337,389 B1 * | 2/2008 | Woolf et al. ................. 715/230 |
| 7,409,633 B2 * | 8/2008 | Lerner et al. ................. 715/230 |
| 2005/0060162 A1 * | 3/2005 | Mohit et al. ................... 705/1 |
| 2005/0065903 A1 * | 3/2005 | Zhang et al. .................. 707/1 |
| 2005/0193325 A1 * | 9/2005 | Epstein ....................... 715/512 |
| 2005/0204058 A1 * | 9/2005 | Philbrick et al. ............. 709/238 |
| 2006/0048046 A1 * | 3/2006 | Joshi et al. ................... 715/512 |
| 2006/0112340 A1 * | 5/2006 | Mohr et al. .................. 715/733 |
| 2006/0235732 A1 * | 10/2006 | Miller et al. .................... 705/7 |
| 2006/0265640 A1 * | 11/2006 | Albornoz et al. ............ 715/512 |
| 2006/0282762 A1 * | 12/2006 | Diamond et al. ............ 715/511 |
| 2007/0016848 A1 * | 1/2007 | Rosenoff et al. ......... 715/501.1 |
| 2007/0118794 A1 * | 5/2007 | Hollander et al. ........... 715/512 |
| 2007/0128899 A1 * | 6/2007 | Mayer ........................ 439/152 |

* cited by examiner

*Primary Examiner*—Steven P Sax
(74) *Attorney, Agent, or Firm*—Wilmer Cutler Pickering Hale & Dorr LLP (57) ABSTRACT

A system for providing a graphical interface to a user includes a server platform and an operating system and application software running thereon. The system further includes a client device capable of running a standard web browser that accesses the software application on the server platform for displaying information to the user in a display area on the client device. The standard web browser displays the information without requiring additional software to be installed or downloaded or run on the client device, and without requiring a scripting language to be enabled in the web browser on the client device. The application software facilitates manipulation by the user of unstructured data in the display area for detailed inspection, and also facilitates the user selectively causing to display annotations within the display area. The application software facilitates the user inserting one or more annotations within the display area, thereby causing an action to occur in either this system or an external system.

1 Claim, 11 Drawing Sheets

Invoice #7090B

Quick Links to Invoice Details  Account Coding  Payment Blocks  Document History ⓘ John Smith (JSMITH) sent you this Non-PO Invoice, noting: "Please Review and Approve" To approve it, place the Approved markup. To question it, place the Comment Requested markup. To reject it (or if you cannot approve it now), place the Route To Accounts Payable markup.

Invoice 1 of 2  [Return to List]  [Previous Invoice] [Next Invoice]

Vendor A-1 Lighting and Interiors

Date 10-AUG-2005   Amount 139,700.00 USD

Show [Default ▼]  Markups [ ][ ]

Image Size: [ ][ ]

Previous Page [1 ▼] of 1 Next Page

| Product ID | Product Name: | Quantity: | Unit Price: | Discount: | Extended Price: |
|---|---|---|---|---|---|
| 1134 | TECH WALL FIXTURE | 115 | 1000.00 | 0% | 115,000.00 |
| 23002 | WILSON SEMI-FLUSH LIGHTS | 50 | 250.00 | 0% | 12,500.00 |
| 322-14-5 | 500 FT ROLL 14 GUAGE WIRE | 1 | 500.00 | 0% | 500.00 |
| 665 | ELECTRICAL RECEPTION BOX | 1 | 2250.00 | 0% | 2250.00 |
|  | 25 LINES |  |  |  |  |
|  | XTNS FOR 3 ADDITIONAL BOXES |  |  |  |  |
|  | 3 VIEWERS |  |  |  |  |

Click on image to zoom in

- ☐ Yellow Sticky Note
- A Green Text
- ✓ Approved
- ⬇ Route To Accounts Payable
- ⬅ Return To
- ? Comment Requested

[Print]
[Fax Request]
[Tutorial]

Account Coding

*This invoice will be charged to the following accounts:*

SYSTEM FOR AND METHOD OF PROVIDING A USER INTERFACE FOR A COMPUTER-BASED SOFTWARE APPLICATION

CROSS REFERENCE TO RELATED APPLICATIONS

This application claims benefit of the following Patent Applications: U.S. Provisional Patent Application Ser. No. 60/802,970, filed May 24, 2006, the contents of which are hereby incorporated by reference in its entirety.

BACKGROUND OF THE INVENTION

The present invention relates to graphical user interfaces, and more particularly, to techniques for displaying information and providing user interaction with respect to various types of data such as structured and unstructured data.

Prior art software applications are limited in several respects. For example, when a user requires both structured and unstructured information, prior art software applications often take the approach of providing the structured information in one window, and the unstructured information in a different window. This is particularly true in business software applications that involve presenting structured information from a big "back-end" enterprise application (referred to herein as an "ERP" system) along with unstructured information in the form of "attached documents" (such as images of original source documents, that may have been scanned or faxed in or received via other electronic means). Structured information is typically displayed in one window, and if the user wants to review the unstructured information (e.g., the original document, an "attachment"), they click on a link to open the original document (the "attachment") in another window. This two-window approach leads to several problems. First, it can be difficult to review both the structured and unstructured information at the same time, difficult to compare the two, and difficult to get the "complete" picture at one time. Second, users often do not bother to open and review the unstructured information, either because it is a "hassle" or because they are not forced to do so (software applications typically allow the user to simply interact with the transaction in the "structured" window, only reviewing the unstructured information in the attachment if they choose to). This leads to less informed decisions, and in scenarios involving the review and approval of transactions can allow users to approve transactions that they have not fully reviewed.

Another prior art limitation can be seen when users are presented with unstructured information (such as images of business documents that were originally in paper format and have subsequently been scanned into images or faxed into a system). Such users often need to be able to manipulate the unstructured information in order to properly view and review it. For example, typical user display screens often require that a user zoom in on an image to be able to read the text on the image of the document, or pan and scroll around the document once it is zoomed in, or rotate the image of the document to read information that may have been in a different orientation, or flip to another page of the document. When software applications allow users to manipulate unstructured information (such as document images) in this fashion, they frequently require that special software be installed on the user's computer. This software may be in various forms (from "native" applications (such as a "Windows" executable on the "Windows" operating system), to browser "plug-ins", to "Java" programs, to "ActiveX" controls, to "Javascript" and more). The problem with this approach is that installing such software on a user's computer is often problematic or undesirable for several reasons, such as:

1. Security concerns—downloaded software may introduce computer viruses or "spy-ware."
2. Involvement of IT (Information Technology) department—configuration control policies can make it difficult or impossible to download software. For example, the user's desktop may be "locked down" and not allow users to install software locally without proper authorization. The software download consequently requires coordination and/or assistance with the IT department, and subsequent support to deal with issues that arise.
3. Configuration problems/conflicts—problems may arise due to the interaction of the downloaded software with other programs and software on the user's computer.
4. System instability—over time, as other software programs are installed, operating system or web browser patches or upgrades are applied, thus degrading or disabling the application software.
5. Platform limitations—compatibility limitations may exist with various platform components, such as operating systems, operating system versions, web browser types, web browser versions, etc. Also, the requirement to install software in order to access the application limits the number and types of devices from which the application can be accessed. For example, Internet accessible cell phones or PDAs are typically unavailable as points of access unless the software has been specifically designed to work on the given device.
6. Accessibility issues—the user is typically only able to access the application if they have first installed the required software, something that they may not have the authorization, ability—or time—to do on given computer. For example, a user may wish to access a particular application while at a public Internet kiosk at an airport or an Internet cafe. However, the user may not have the time or authority (or both) to first install the required software on the given computer.

It is often useful for users to be able to annotation or "mark up" an image of a document, by placing annotations directly onto the image of the document itself, for subsequent viewing by themselves or by other users. However, when this capability is provided to users in prior art systems, it typically requires the installation of special software on the user's computer. This approach has all of the same problems identified above.

In prior art systems, when software applications present both unstructured information (such as images of documents) and structured information to a user, often the structured information is not "live" or "real time" information from the true, definitive source of that information. Rather, this information is typically either a "copy" that is prone to becoming "stale" (i.e., out of date and inaccurate), or isn't even from the definitive source of that information (e.g., it may be from a second computer system, such as the "indexing" data entered into a document imaging system, rather than the actual data from the definitive source—the company's "ERP" system). Both of these approaches have problems, such as:

1. Users can be, and often are, viewing information that is "out of date" and inaccurate.
2. Because two copies of the data exist (one in the ERP system and one in the application), it becomes easy for the copies of the data to get "out of sync"
3. Because two copies of the data exist, extra effort is typically required to enter information into these two separate systems.

4. Since extra effort is involved to enter data into the two separate systems, typically only a subset of the full amount of data is entered into the application, and therefore only that subset of the full amount of data is available for display to the user in the application.

Prior art systems often lack real-time validation of data. When applications of prior art systems allow the user to enter data, they often don't validate this entered data in real-time against the definitive source of validation, such as a back-end ERP system. This requires extra subsequent steps to either manually verify the data or resolve problems occurring from data that subsequently fails validation against the definitive system, such as the ERP system.

Prior art systems typically do not provide substantial interaction with back-end ERP systems. When applications allow users to take actions (such as "approving" a vendor invoice, for example), the result is often that another person must then manually update the back-end ERP system to reflect the fact that the original user has taken the particular action. This is problematic for several reasons. On the one hand, extra effort required. Further, the procedure introduces opportunities for accidental error. Also, the procedure is not an automated, controlled process. For example, the second (updating) person may not accurately reflect the decision of the first person (the user).

Prior art systems do not provide a user with a context-sensitive display of information. Typically, the information displayed to a user is "fixed" in nature—that is, all users typically see the same information, regardless of the state of the particular business process, regardless of who they are, and any number of other factors. With this approach, too much data may be presented to a given user (more data than they will bother to review). Further, insufficient data may be presented to a given user (for example, at times only data that is common across all scenarios is displayed). Also, inappropriate data may be presented to a given user (possibly violating security or information access policies).

Similarly, prior art systems do not provide context-sensitive instructions. "Casual" users are often unsure of why they are being asked to review a given transaction, what their options are, and how to go about taking one of those options or actions. Generic and static instructions are sometimes provided, however these are often not helpful enough to allow a given user to be able to understand what they are being asked to do, why, and how to do it.

SUMMARY OF THE INVENTION

The embodiments described herein include software, executing on a computer platform, which can be used in a variety of application scenarios, to provide an improved application user interface. The scenarios in the exemplary embodiments are directed to business-related applications, but are not intended to be limiting. The concepts described by the exemplary embodiments also apply to other application scenarios.

In one aspect, the system is a system for providing a graphical interface to a user, including a server platform and an operating system and application software running thereon. The system also includes a client device capable of running a standard web browser that accesses the software application on the server platform for displaying information to the user in a display area on the client device. The web browser does not require additional software to be installed or downloaded or run on the client device and does not require a scripting language to be enabled in the web browser on the client device. The application software facilitates manipulation by the user of unstructured data in the display area for detailed inspection, and facilitates the user selectively causing to display annotations within the display area.

In one embodiment, the manipulation includes at least one of zooming, panning and rotating of the unstructured data. In another embodiment, the client device is one of a desktop computer, a laptop computer, a wireless mobile device, a PDA device, or a computing platform within a public kiosk. In another embodiment, the additional software further includes web browser plug-ins, extensions, enabled scripting language, enabled applet support or other enabled adjunct code support.

In one embodiment, the application facilitates the user inserting one or more annotations within the display area. In another embodiment, the user inserting one or more annotations causes an action to occur in either this system or an external system.

In another aspect, a system for providing a graphical interface to a user includes a server platform and an operating system and application software running thereon, and a client device capable of running a standard web browser that accesses the software application on the server platform for displaying information to the user in a display area on the client device. The application simultaneously provides structured information and business document images within the display area, and conditionally provides context-dependent information within the display area.

In another embodiment, the application provides the context-dependent information conditional on at least one of (i) the user's identity, (ii) one or more details of the structured information or business documents, (iii) one or more details of a business transaction associated with at least one of the structured information or the business documents, (iv) a current state of the business transaction, and (v) one or more preferences of the user.

In another embodiment, the application receives the context-dependent information from an source external to the system. In one embodiment, the external source is a standard packaged, off the shelf application.

In another aspect, a system for providing a graphical interface to a user includes a server platform and an operating system and application software running thereon, and a client device capable of running a standard web browser that accesses the software application on the server platform for displaying information to the user in a display area on the client device. The application software simultaneously provides structured information and business document images within the display area. The application software also facilitates the user performing context-dependent actions related to a transaction associated with at least one of the structured information and the business documents. The application prompts the user for context-dependent information related to the actions, and the context-dependent actions triggers operations in one or more other systems external to the computer platform.

In one embodiment, the application prompts the user for context-dependent information in a single-step input process. In another embodiment, the application prompts the user for context-dependent information in a multiple-step input process. In yet another embodiment, the application is accessed from a client device capable of running a standard web browser that accesses the software application on the server platform for displaying information to the user in a display area on the client device. The web browser does not require additional software to be installed or downloaded or run on the client device, and does not require a scripting language to be enabled in the web browser on the client device, or web browser plug-ins, extensions, enabled scripting language, enabled applet support or other enabled adjunct code support.

In another aspect, a system for providing a graphical interface to a user includes a server platform and an operating system and application software running thereon, and a client device capable of running a standard web browser that accesses the software application on the server platform for displaying information to the user in a display area on the client device. The application software simultaneously provides structured information and business document images within the display area, and provides one or more lists of valid choices based on data from another system external to the computer platform.

In one embodiment, the data is real-time data.

In another aspect, a system for providing a graphical interface to a user includes a server platform and an operating system and application software running thereon, and a client device capable of running a standard web browser that accesses the software application on the server platform for displaying information to the user in a display area on the client device. The application software simultaneously provides structured information and business document images within the display area, and validates information provided by the user with respect to data provided by another system external to the computer platform.

In one embodiment, the web browser displays the information to the user without requiring additional software to be installed or downloaded or run on the client device and without requiring a scripting language to be enabled in the web browser on the client device.

In another aspect, a system for providing a graphical interface to a user includes a server platform and an operating system and application software running thereon, and a client device capable of running a standard web browser that accesses the software application on the server platform for displaying information to the user in a display area on the client device. The web browser does not require additional software to be installed or downloaded or run on the client device and without requiring a scripting language to be enabled in the web browser on the client device, or web browser plug-ins, extensions, enabled scripting language, enabled applet support or other enabled adjunct code support. The application simultaneously provides structured information and business document images within the display area, and the application conditionally provides context-dependent information within the display area, the context-dependent information originating from an source external to the system, the external source being a standard packaged, off the shelf application. The application software facilitates manipulation by the user of unstructured data in the display area for detailed inspection, provides one or more lists of valid choices based on data from another system external to the computer platform, and facilitates the user selectively causing to display annotations within the display area. The application facilitates the user inserting one or more annotations within the display area, and inserting the one or more annotations causes an action to occur in either this system or an external standard, off the shelf system. The application software facilitates the user performing context-dependent actions related to a transaction associated with at least one of the structured information and the business documents. The application prompts the user for context-dependent information related to the actions, wherein validates information provided by the user with respect to data provided by another system external to the computer platform, and the context-dependent actions may trigger operations in one or more other systems external to the computer platform.

In another aspect, a method of providing a graphical interface to a user includes providing application software running on a first platform, and running a standard web browser on a second platform separate from the first platform. The web browser accesses the software application for displaying information to the user in a display area on the second platform, without requiring additional software to be installed or downloaded or run on the second platform and without requiring a scripting language to be enabled in the web browser on the second platform or web browser plug-ins, extensions, enabled scripting language, enabled applet support or other enabled adjunct code support. The method further includes using the application software to facilitate manipulation by the user of unstructured data in the display area for detailed inspection. The method also includes using the application software to facilitate the user selectively causing to display annotations within the display area.

In one embodiment, the method further includes using the application software to facilitate the user inserting one or more annotations within the display area. In another embodiment, the method further includes causing an action to occur in either this system or an external system as a result of the user inserting the one or more annotations within the display area.

In another aspect, a system for providing a graphical interface to a user includes a server platform and an operating system and application software running thereon, and a client device capable of running a standard web browser that accesses the software application on the server platform for displaying information to the user in a display area on the client device. The application simultaneously provides structured information and business document images within the display area. The user inserting one or more annotations causes an action to occur in either this system or an external system.

In one embodiment, the external system is a standard packaged, off the shelf application.

In another aspect, a system for providing a graphical interface to a user includes a server platform and an operating system and application software running thereon, and a client device capable of running a standard web browser that accesses the software application on the server platform for displaying information to the user in a display area on the client device. The web browser does not require additional software to be installed or downloaded or run on the client device and without requiring a scripting language to be enabled in the web browser on the client device. The application software simultaneously provides structured information and business document images within the display area, and facilitates manipulation by the user of unstructured data in the display area for detailed inspection.

In one embodiment, the application software facilitates the user selectively causing to display annotations within the display area. In another embodiment, the application facilitates the user inserting one or more annotations within the display area. In yet another embodiment, the user inserting one or more annotations causes an action to occur in either this system or an external system.

In another aspect, a system for providing a graphical interface to a user includes a server platform and an operating system and application software running thereon, and a client device capable of running a standard web browser that accesses the software application on the server platform for displaying information to the user in a display area on the client device. The web browser does not require additional software to be installed or downloaded or run on the client device and without requiring a scripting language to be enabled in the web browser on the client device or web browser plug-ins, extensions, enabled scripting language, enabled applet support or other enabled adjunct code support. The application software simultaneously provides structured information and business document images within the display area, and facilitates manipulation by the user of unstructured data in the display area for detailed inspection. The application facilitates the user inserting one or more annotations within the display area.

In one embodiment, the user inserting one or more annotations causes an action to occur in either this system or an external system.

In another aspect, a system for providing a graphical interface to a user includes a server platform and an operating system and application software running thereon, and a client device capable of running a standard web browser that accesses the software application on the server platform for displaying information to the user in a display area on the client device. The web browser does not require additional software to be installed or downloaded or run on the client device and without requiring a scripting language to be enabled in the web browser on the client device, or web browser plug-ins, extensions, enabled scripting language, enabled applet support or other enabled adjunct code support. The application software simultaneously provides structured information and business document images within the display area, and facilitates the user inserting one or more annotations within the display area.

In one embodiment, the user inserting one or more annotations causes an action to occur in either this system or an external system.

In another aspect, a system for providing a graphical interface to a user includes a server platform and an operating system and application software running thereon, and a client device capable of running a standard web browser that accesses the software application on the server platform for displaying information to the user in a display area on the client device. The web browser does not require additional software to be installed or downloaded or run on the client device and without requiring a scripting language to be enabled in the web browser on the client device, or web browser plug-ins, extensions, enabled scripting language, enabled applet support or other enabled adjunct code support. The application software simultaneously provides structured information and business document images within the display area, and facilitates the user inserting one or more annotations within the display area. The user inserting one or more annotations causes an action to occur in either this system or an external system.

In one embodiment, the other systems external to the computer platform are running at least one standard packaged, off the shelf application. In another embodiment, the application software provides one or more lists of valid choices based on data from another system external to the computer platform. In yet another embodiment, the application software validates information provided by the user with respect to data provided by another system external to the computer platform.

In one embodiment, the application software facilitates manipulation by the user of unstructured data in the display area for detailed inspection. In another embodiment, the other systems external to the computer platform are running at least one standard packaged, off the shelf application. In still another embodiment, the applications software provides one or more lists of valid choices based on data from another system external to the computer platform.

In one embodiment, the applications software validates information provided by the user with respect to data provided by another system external to the computer platform.

In another aspect, a system for providing a graphical interface to a user includes a server platform and an operating system and application software running thereon, and a client device capable of running a standard web browser that accesses the software application on the server platform for displaying information to the user in a display area on the client device. The application simultaneously provides structured information and business document images within the display area. The user inserting one or more annotations causes an action to occur in either this system or an external system.

In one embodiment, the applications software facilitates the user performing context-dependent actions related to a transaction associated with at least one of the structured information and the business documents. The application prompts the user for context-dependent information related to the actions, and the context-dependent actions triggers operations in one or more other systems external to the computer platform.

In another embodiment, the other systems external to the computer platform are running at least one standard packaged, off the shelf application. In another embodiment, the application software provides one or more lists of valid choices based on data from another system external to the computer platform.

In one embodiment, the application software validates information provided by the user with respect to data provided by another system external to the computer platform.

DESCRIPTION OF THE PREFERRED EMBODIMENTS

Figure 1A:
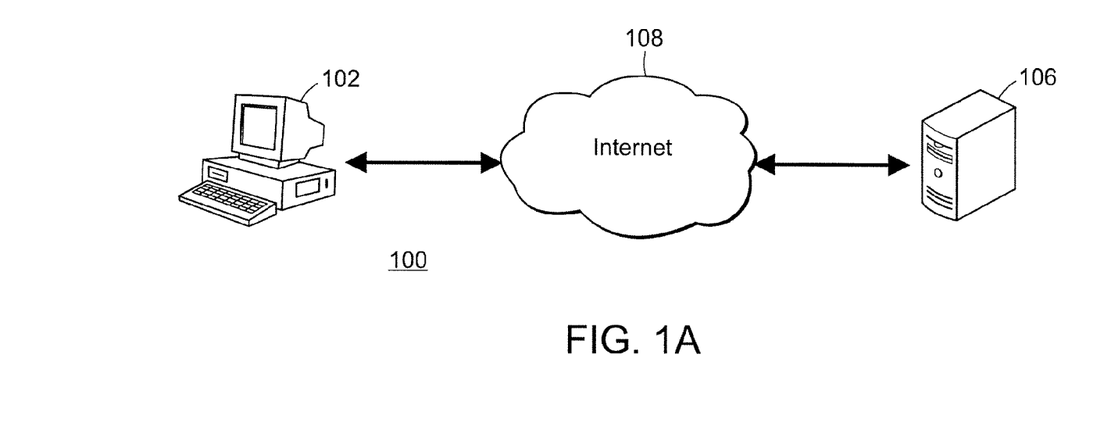
FIGS. 1A and 1B show one embodiment of a system for providing a user interface for a computer-based software application.
Figure 1B:
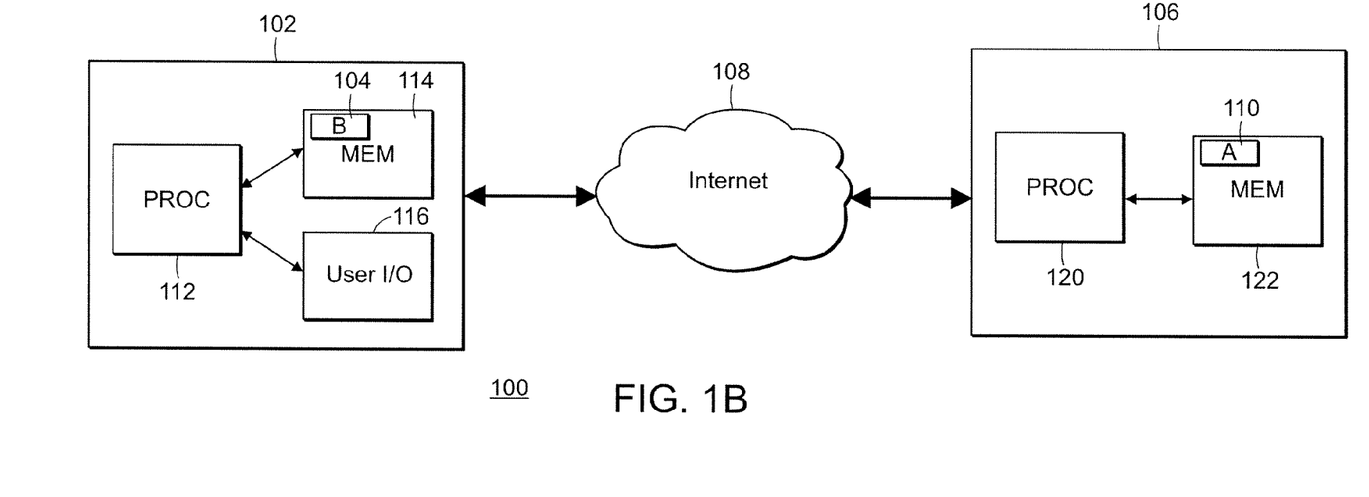

FIGS. 1A and 1B show one embodiment of a system for providing a user interface for a computer-based software application according to the present invention. FIG. 1A is a simplified component view of the system 100, and FIG. 1B is a block diagram view of the system 100. For simplicity and clarity, only the components of the system 100 that are necessary for the description herein are shown in FIGS. 1A and 1B. It should be understood that other components, although not shown, are generally present in the system 100 to provide functionality not directly related to the described embodiments.

The system 100 includes a client device 102 capable of storing and executing a standard web browser 104 known in the art. In general, the client device 102 is a computing platform capable of storing and executing software code, and providing input/output facilities for a user. The client device 102 may be, for example, a desktop or laptop computer, a wireless mobile device, a PDA device, or a computing platform within a public kiosk, although other such computing platforms may also be used. The client can be any device that runs a web browser 104 capable of accessing and displaying Hyper Text Markup Language (HTML).

The client device 102 communicates with a server platform 106. The client device 102 and the server platform 106 may be positioned in geographically remote locations with respect to one another, or they may be relatively close to one another. Communication between the client device 102 and the server platform 106 may occur through a network 108 (e.g., the Internet or a corporate intranet) as shown in FIGS. 1A and 1B, although the communication may alternatively occur through a dedicated channel or other communication path known in the art. The communication protocol used to convey information over the communication path between the client device 102 and the server platform 106 may be any protocol suitable for the communication path being used.

The client device 102 accesses a software application 110 that resides on the server platform 106. The software application 110 provides functionality for displaying information to the user in a display area on the client device 102, without requiring additional software (beyond the standard web browser 104) to be installed, downloaded or executed on the client device 102. The browser does not require additional "plug-ins" or other extensions to utilize the display functionality of the software application 110. Further, the browser 104 does not require any scripting language to be enabled (e.g., no "Javascript" or "VBScript" or other scripting language support is required) or any "applet" support or similar adjunct code support to be enabled (e.g., no "Java applets" or "ActiveX" controls or other "controls" or non-HTML-only browser capabilities or extensions are required) to utilize the display functionality (including interactive operations) of the software application 110. In at least one embodiment, only plain HTML 1.0 support is required for the client device 102 to utilize the display functionality of the software application 110.

In general, the client device 102 includes a processor 112, memory 114 and input/output functionality 116 accessible to the user, although the client device 102 typically includes other components. The processor 112 can include any computing engine known in the art that is capable of executing software code.

The memory 114 can include any storage medium that is capable of storing software code. The memory 114 may include, but is not limited to, disk drives, CD ROM, flash memory, and other storage media known in the art.

The input/output functionality 116 may include a display device such as a flat-panel display, an LCD array, a CRT display, or other such displays. The input/output functionality 116 may also include data entry mechanisms such as a keyboard or keypad, a mouse or similar functionality, voice or optical input, or input windows or fields implemented via the display device.

In general, the server platform 106 includes a processor 120 and memory 122. As with the client device, the processor 120 for the server platform 106 can include any computing engine known in the art that is capable of executing software code, and the memory 122 can include any storage medium that is capable of storing software code. Since the server platform 106 typically has different processing and memory requirements as compared to the client device 102, the actual processor 120 and memory 122 used for the server platform 106 may be different than that used for the client device 102.

In the described embodiments, the client device 102 utilizes the application software 110 as described above to provide one or more of the following functionalities:

1. Dual mode display—The display of both "structured" and "unstructured" information in the same page of a web browser 104 on the client device 102. In general, "structured information" is content that also includes some indication of what role that content plays in the overall document. "Markup languages" such as Extensible Markup Language (XML) and Hyper Text Markup Language (HTML) are mechanisms for identifying structures in a document, i.e., for identifying the roles the content plays. "Unstructured information" is data that does not include any such role indications, and typically includes "as-is" scanned images of documents.
2. Stand-alone Operation—The display of information and provision of interactive fields within the display, without requiring additional software to be installed on the client device 102 other than a standard web browser. Additional software includes any browser supporting software such as plug-ins, scripting support, Java applets, ActiveX controls, among others. For example, the web browser does not need to have scripting enabled to provide the described functionality.
3. Manipulation of Unstructured Data—The provision of tools or other agencies that provide the user with the capability to manipulate unstructured information in the browser display. Such manipulation may include zooming, panning, rotating and other transformations that allow the user to more closely and accurately inspect the unstructured data.
4. Insertion of Annotations—The provision of tools or other agencies that provide the user with the capability to place various types of annotations (i.e., markups) on the document in the browser display.
5. Annotation Actions—The linking of annotation insertions to operations in external systems. For example, a user may place an annotation in a document stating "review required by John Doe." In one embodiment, this annotation triggers an external system (e.g., an e-mail system) to forward a request for review to John Doe.
6. Annotation Screening—The provision of tools or other agencies that provide the user with the capability to control the display of annotations (i.e., markups) on the document. The screened annotations may be those created by the user or by other users. The annotation screening tools/agencies operate under security control, so that the user must have proper authorization screen the annotations.
7. Conditional Presentation of Context-Dependent Information—Displaying information that is relevant to the task at hand, conditionally based on various parameters. Such parameters may include, but are not limited to (i) the identity of the user, (ii) the details of the business transaction the user is handling, (iii) the current state of the transaction, (iv) personal preferences of the user.
8. Retrieval of Context-Dependent Information—Accessing an external system (i.e., a system beyond the immediate functionality of the client device 102 and the server platform 106) retrieve context-dependent information. Such retrieval can be either "canned" (i.e., sampled and stored for retrieval, and only periodically refreshed) or "live/real-time" (i.e., information sampled from the source at the time the information is required). In some embodiments, the external system is a standard "packaged" application, such as an "ERP" system, Financials system, "CRM" system, "HR" system or other standard packaged application known in the art that is used by a company in the operation of part of or all of its business.
9. Conditional Presentation of Context-Dependent Instructions—Displaying instructions that are relevant to the task at hand, conditionally based on various parameters. Such parameters may include, but are not limited to (i) the identity of the user, (ii) the details of the business transaction the user is handling, (iii) the current state of the transaction, (iv) personal preferences of the user.

10. Context-dependent Input—The provision of tools or other agencies that provide the user with the capability to take context-dependent actions on a transaction associated with the browser display. In one embodiment, the context-dependent actions include providing various context-dependent input, where the user is prompted for that input in single-step or multi-step input processes. The user actions can trigger or otherwise cause other operations in other external systems. In some embodiments, the operations in the other external systems occur in real time. In some embodiments, the external systems are standard "packaged" applications, such as an "ERP" system, Financials system, "CRM" system, "HR" system or other standard packaged application used by a company in the operation of part of or all of its business.

11. Valid Choice Lists—Displaying lists of valid choices to the user based on data from other external systems. In some embodiments, the provision of the valid lists from the external systems occurs in real time.

12. User Input Validation—Validating input provided by the user with respect to one or more external systems. In some embodiments, the validation occurs in real time.

13. Operation Security—Evaluating each operation performed by the user via the browser, and only allowing the user to perform a particular operation if the user is authorized to perform that operation. In some embodiments, the evaluation includes determining if the user has authorization to data or other items related to the operation. Can (optionally) integrate security and authorization functions with an external system 14. Security Coordination With External Systems—Integrating security and authorization functions with an external system, where that system is a standard "packaged" application, such as an "ERP" system, Financials system, "CRM" system, "HR" system or other standard packaged application used by a company in the operation of part of or all of its business In the described embodiments, the client device 102 uses the application software 110 to accomplish various different process scenarios, depending on a specific combination of functionalities described above.

In an exemplary embodiment, the application software 110 is used in a business process that involves the review and approval of vendor invoices. Through this software application 110, a business user is presented with information about an invoice that requires his or her review and approval. The information can include both "unstructured" information (e.g., an image of the original invoice document as it was received from the vendor) plus "structured" information (such as the invoice amount, invoice date, vendor name, GL account information, etc.—all accessed in real time from the company's "ERP" (financial) system). The user inspects the image of the original invoice by, for example, flipping through document pages, zooming in and out on a particular page, rotating a page, etc. The user reviews other related information that is presented about the invoice. The user reads context-sensitive instructions that explain why the user is being requested to review this invoice, what options are available at this point in the business process, and how to take various actions. If the scenario requires it, the user can add annotations to the document (e.g., virtual "sticky notes," text, etc.) as notes to themselves or to others in the business process. The user can ultimately take an action such as "approving" or "rejecting" the invoice by clicking on an "approval" or "rejection" tool, which will cause the invoice to be approved or rejected as appropriate, communicate this information automatically to the company's "ERP" (financial) system, and allow the user to proceed with their next item of work.

Figure 2:
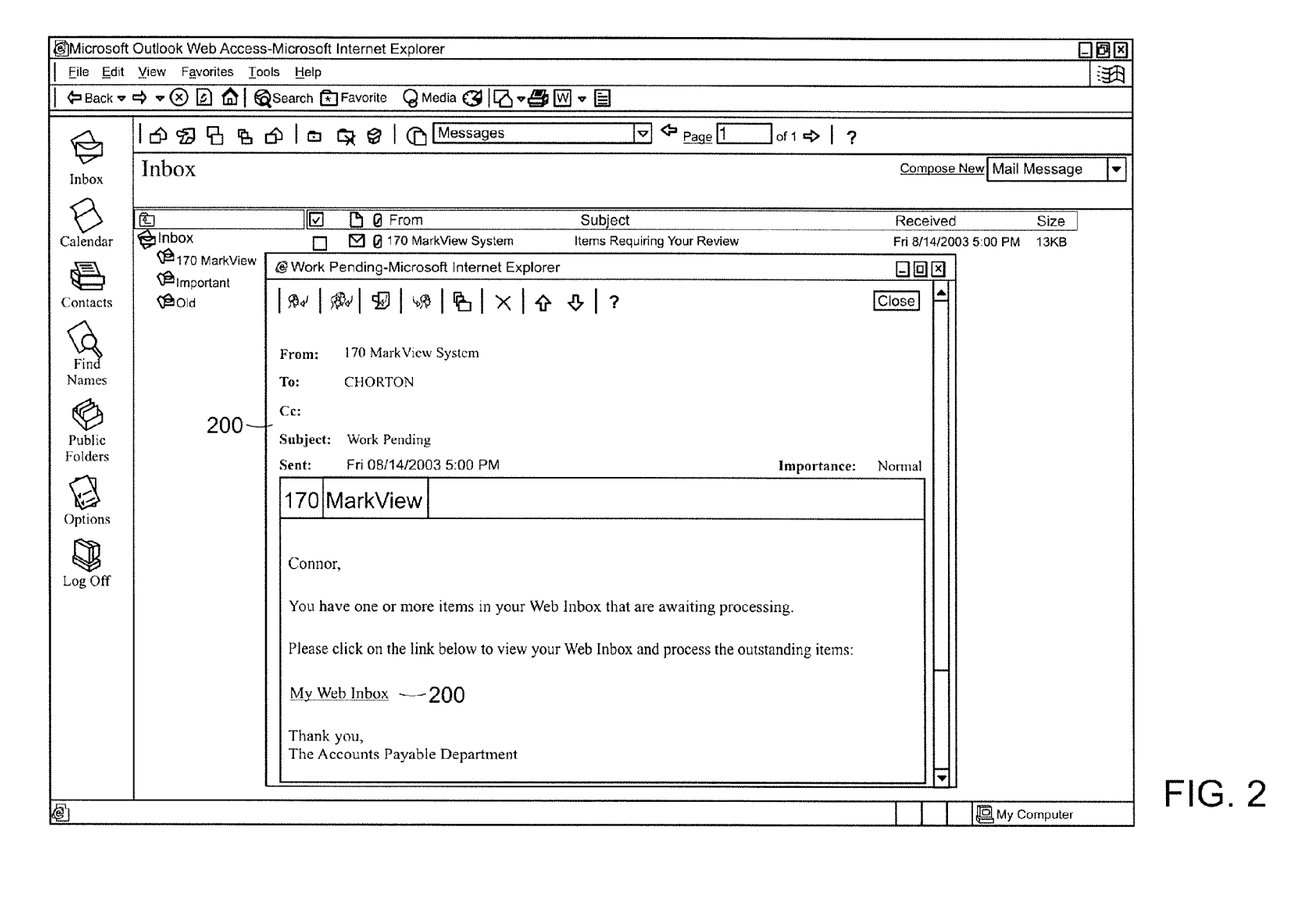
FIGS. 2-11 show various user interface displays of one embodiment of a system for providing a user interface.
Figure 3:
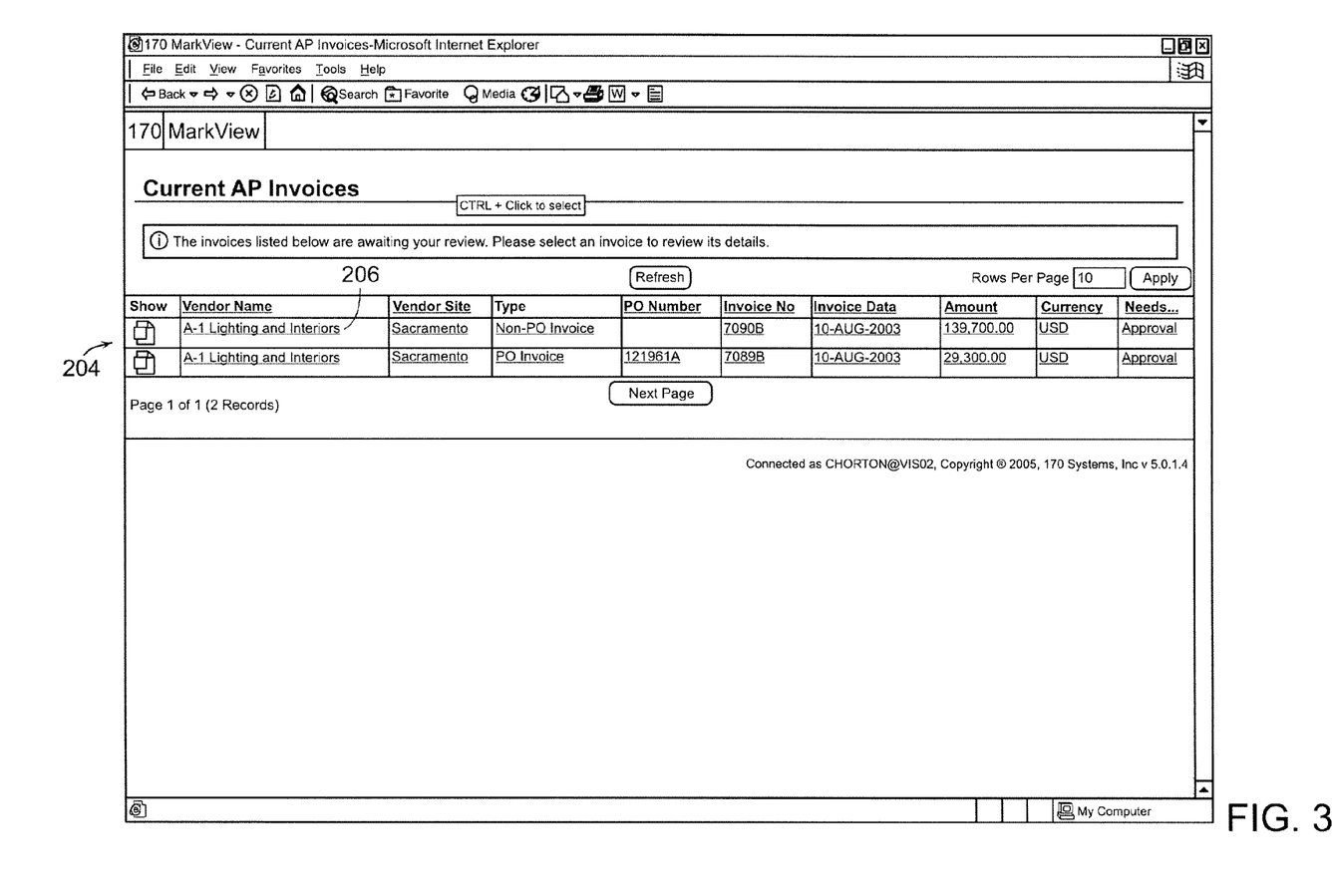
Figure 4:
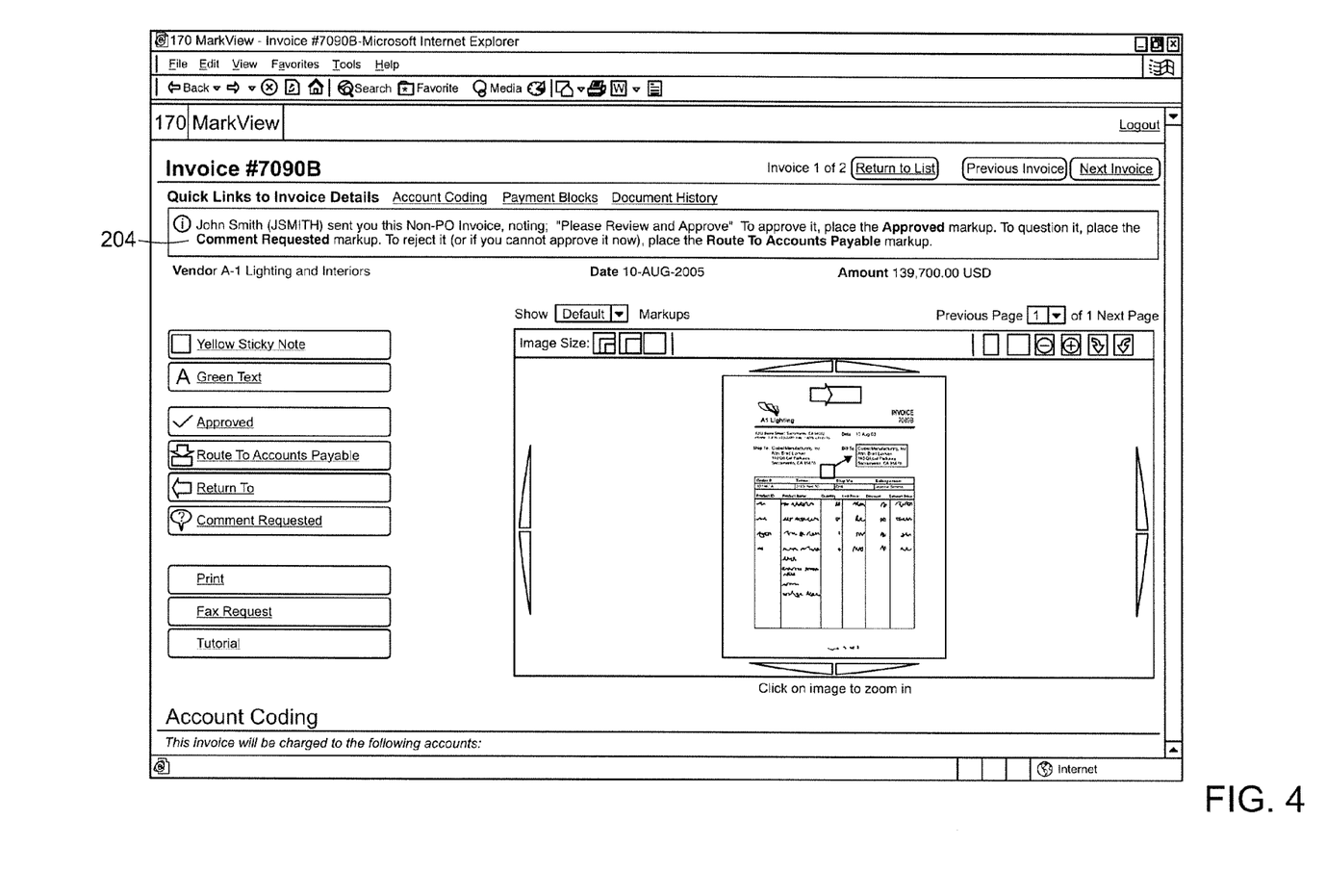

In another exemplary embodiment, a user receives an email notification 200 that they have items awaiting their review, as shown in FIG. 2. The user selects (e.g., by "clicking" with a mouse-controlled curser) a link 202 in the email message, which opens a list 204 of the items awaiting their review in a browser display, as shown in FIG. 3. The user selects one of the items 206, which opens a page that displays, in a single browser window, all of the relevant information (both structured data and unstructured data) relating to that item, as shown in FIG. 4. In this embodiment, the structured data is "live" (i.e. retrieved and displayed real-time from an external system, not copied from a periodically-refreshed source), and is context-dependent (i.e. the information shown depends on the item, who the user is, the state within the business process, and other "contextual" information). Context-dependent instructions 208 are displayed to the user, which explain why the user is being presented with this item, what his options are, and how to select or use one or more of those options.

Figure 5:
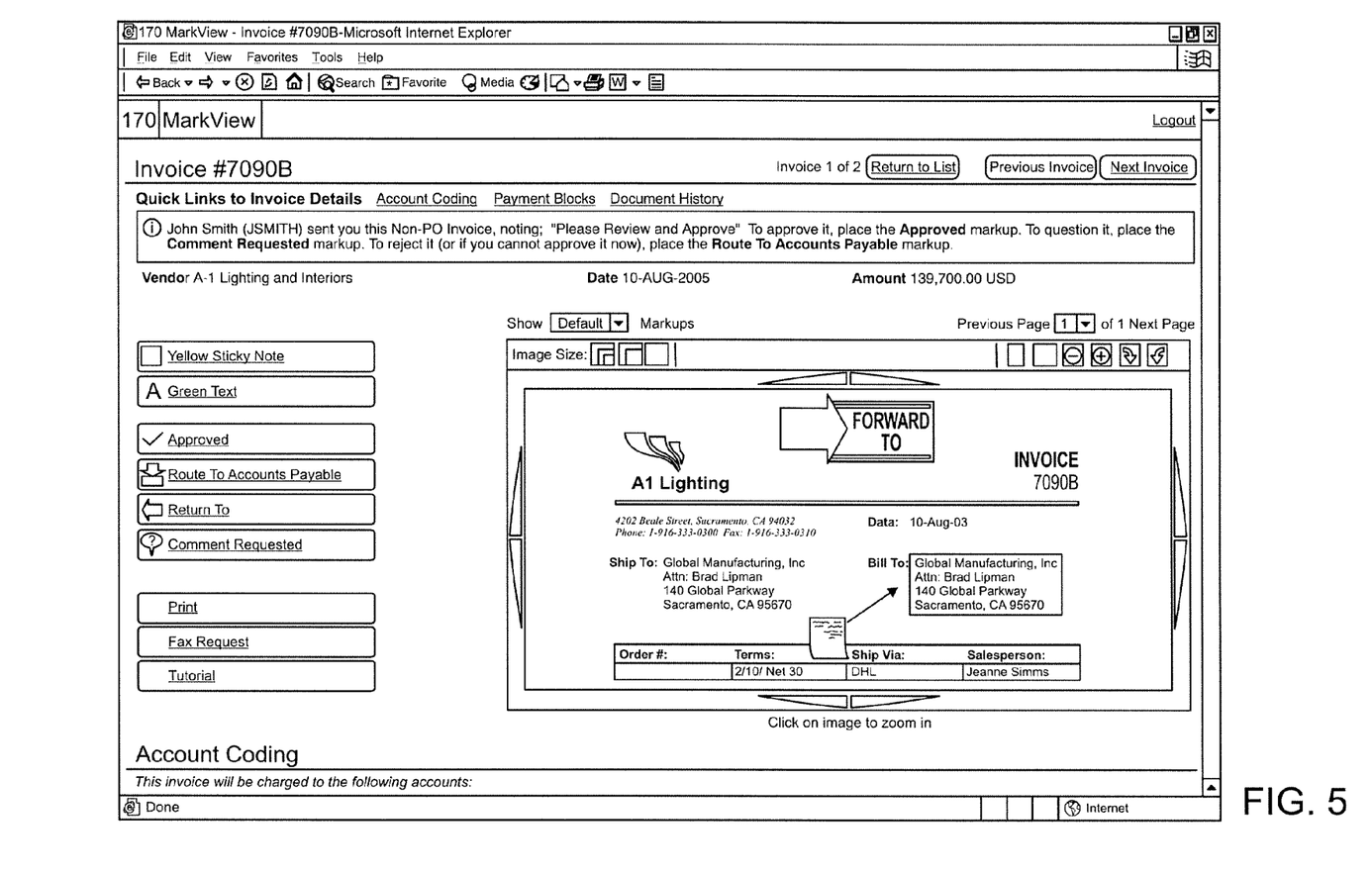
Figure 6:
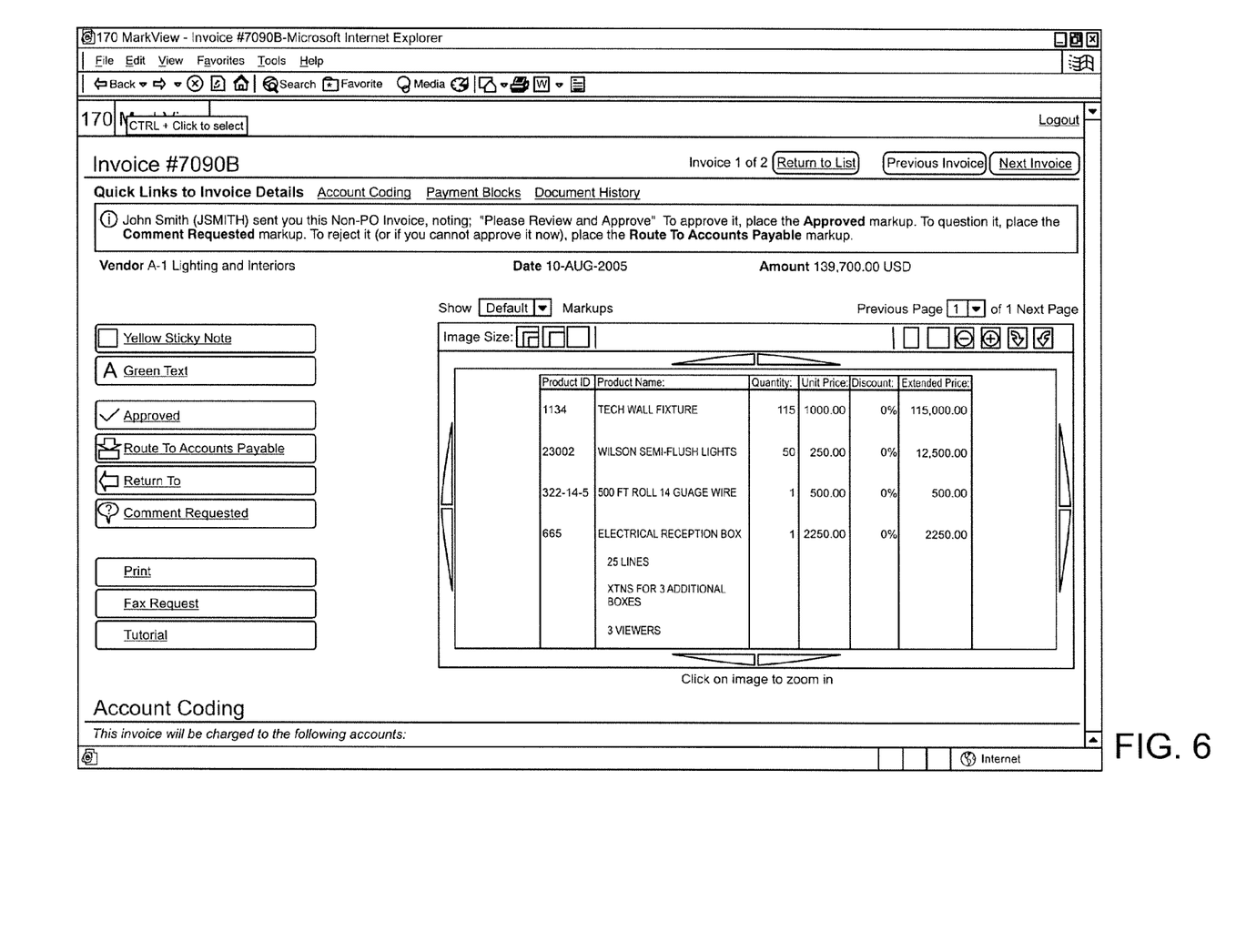
Figure 7:
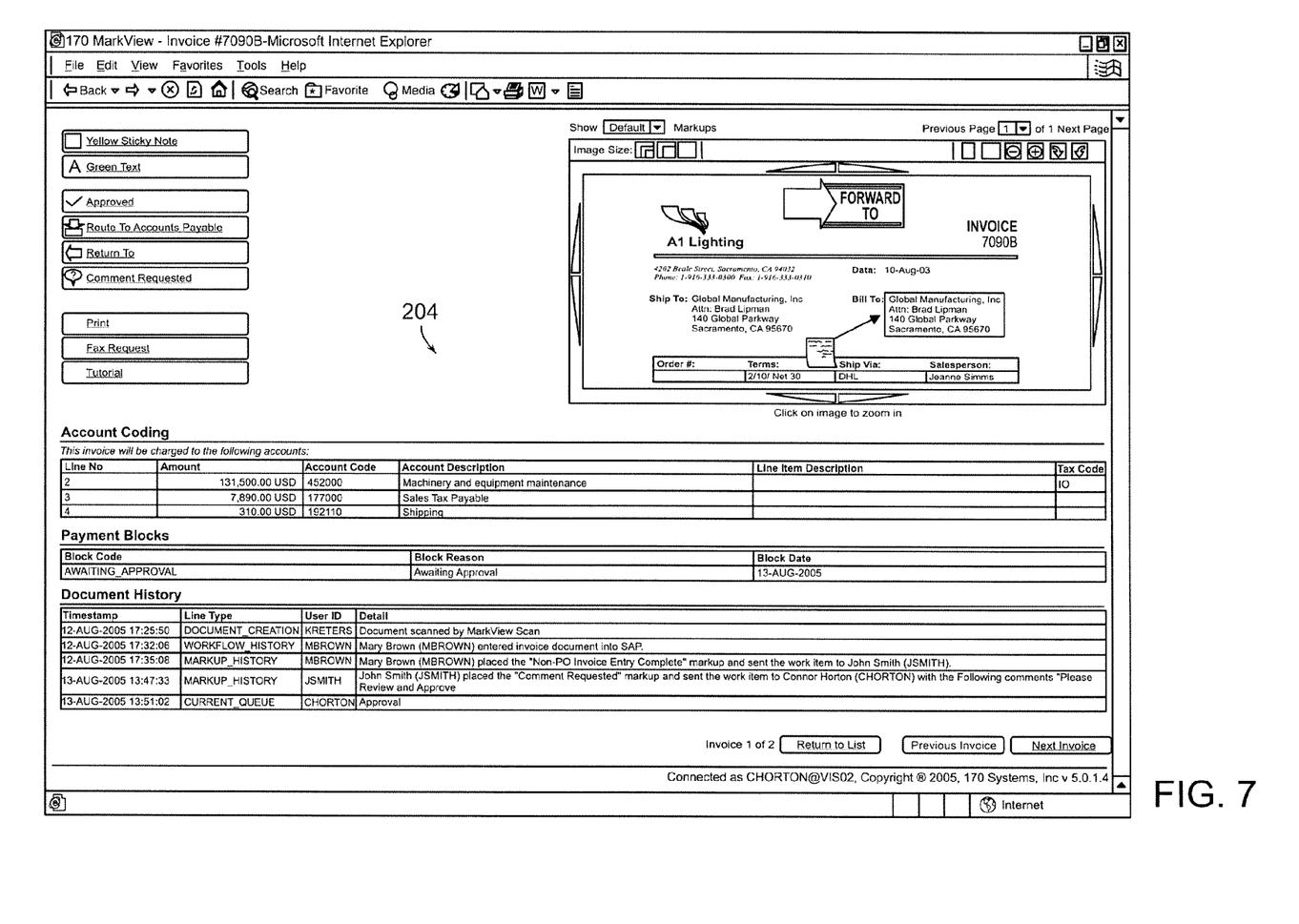
Figure 8:
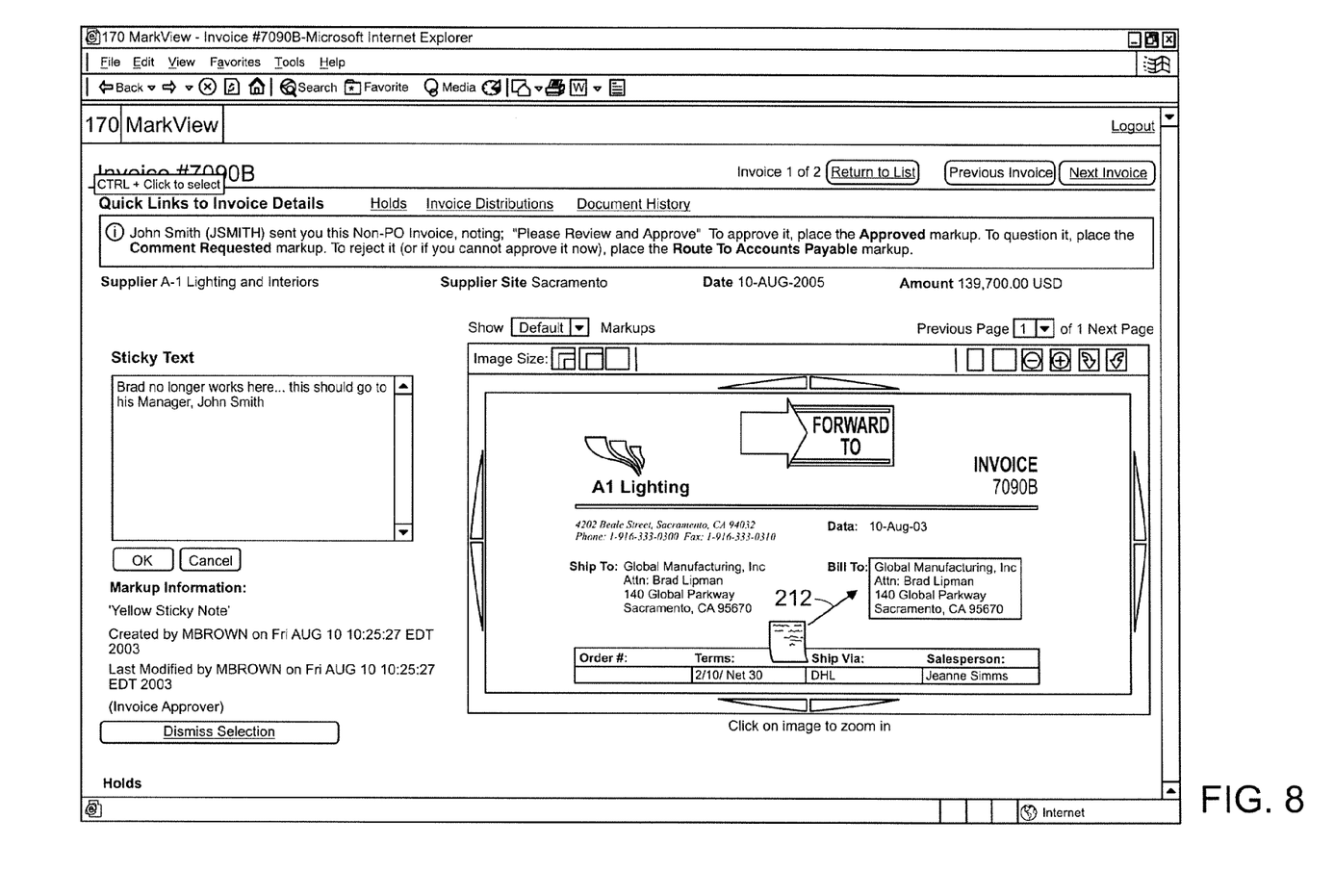

The user may manipulate the unstructured information (for example, they may zoom in or out on the image of the document, pan/scroll around the image, rotate it, flip pages, etc.), as shown in FIGS. 5 and 6. Additional context-sensitive structured information 210 is displayed at other locations within the single window (bottom half of window shown in FIG. 7). As shown in FIG. 8, the user has the ability to show and hide annotations 212 (i.e., markups) created by other users and/or himself, under security control.

Figure 9:
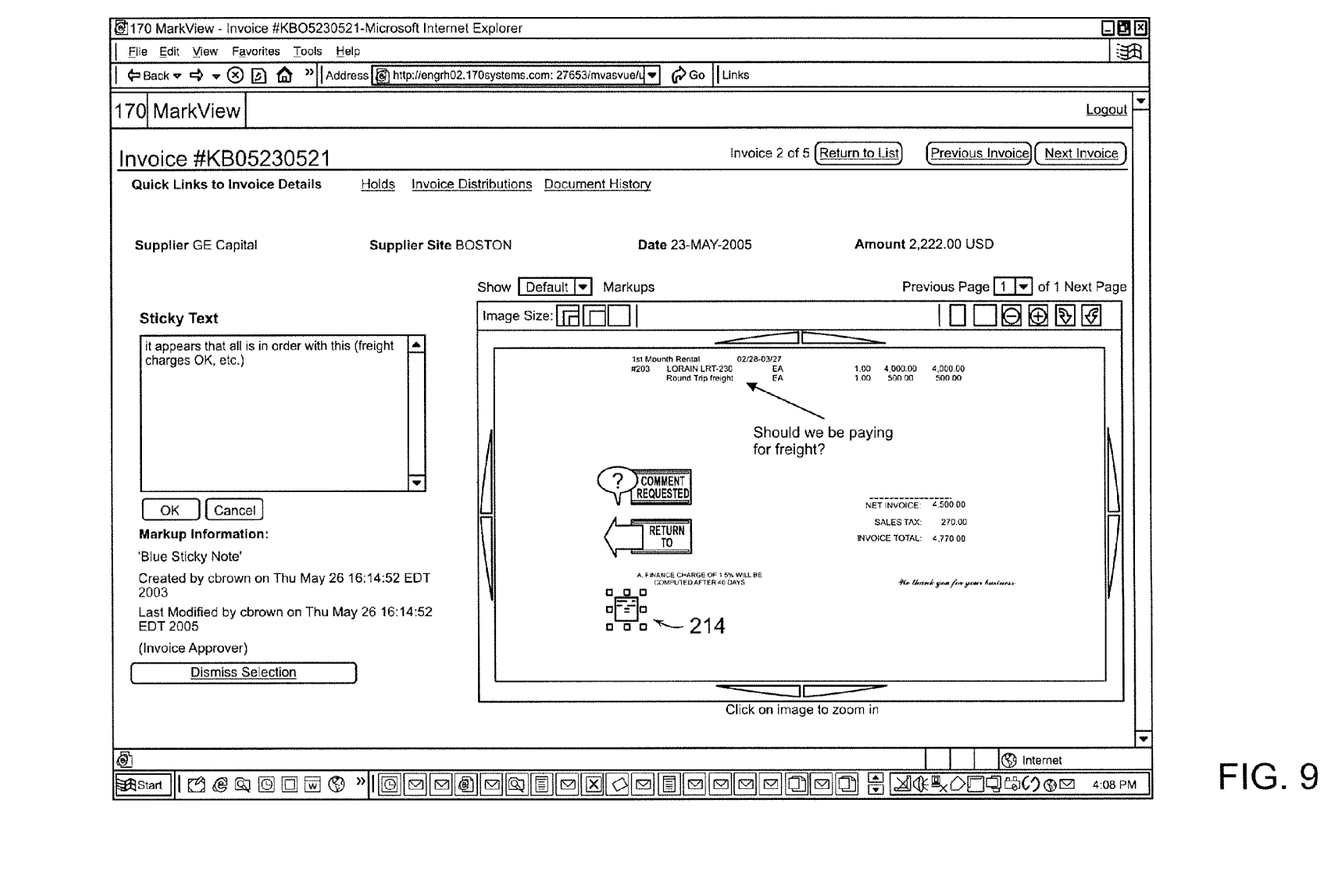

The user may be authorized to hide or show annotations on the document created by prior users or by himself, with proper security control. The user may create additional annotations directly on the document image, with proper security. As shown in FIG. 9, the user creates a "sticky note" 214 on the document image.

Figure 10:
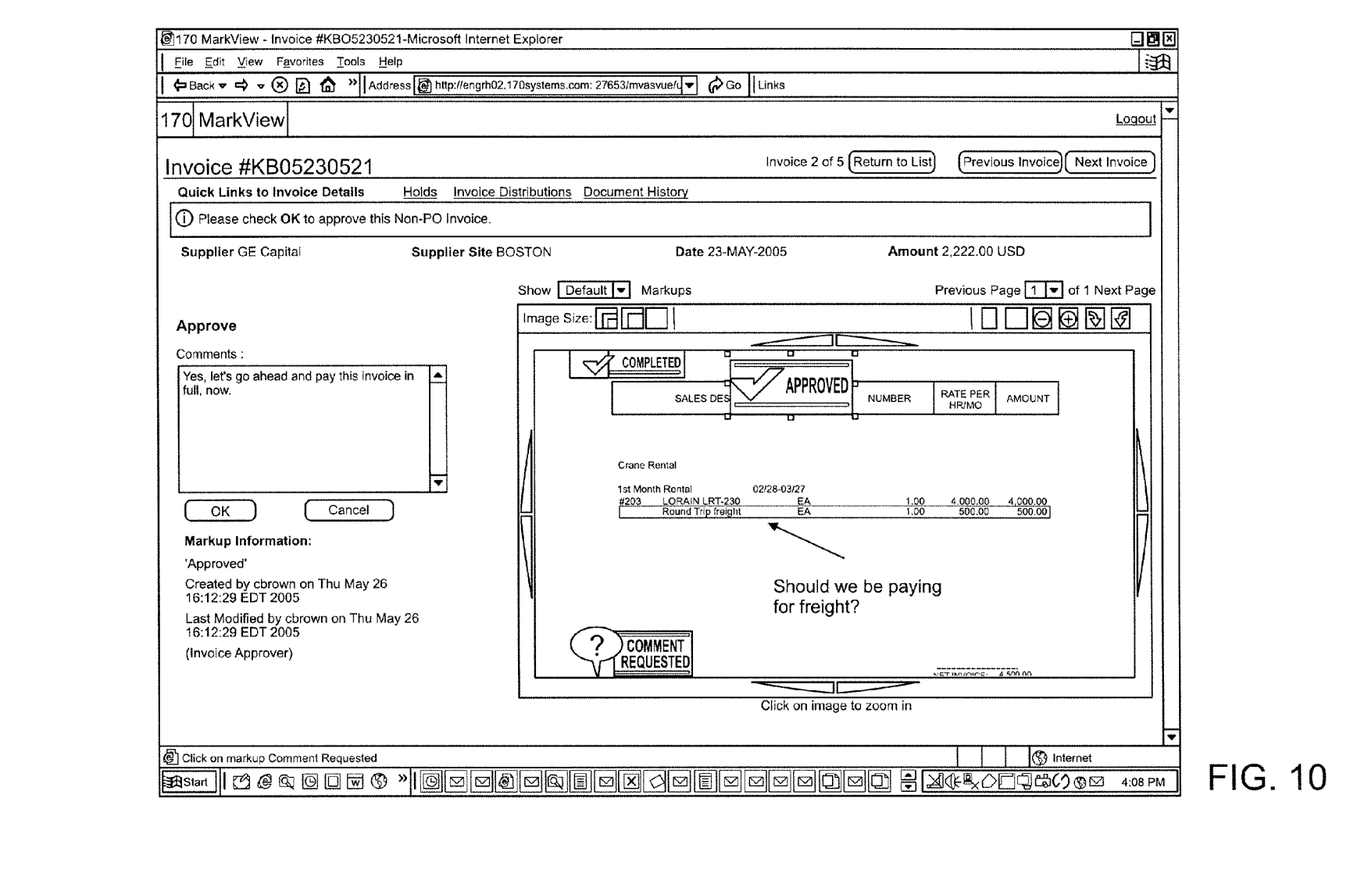

The user may take an authorized, context-sensitive action on the item, under security control, as shown in FIG. 10. Here placing an "Approved" stamp 220 on the document, thus "approving" the invoice for payment, which can automatically cause a related operation (such as paying the vendor) to occur within an external system (e.g., the company's financial system). In some embodiments, user actions can further prompt confirmations or other validations, which require a user response or additional input (e.g., "are you sure you want to approve this item?").

Figure 11:
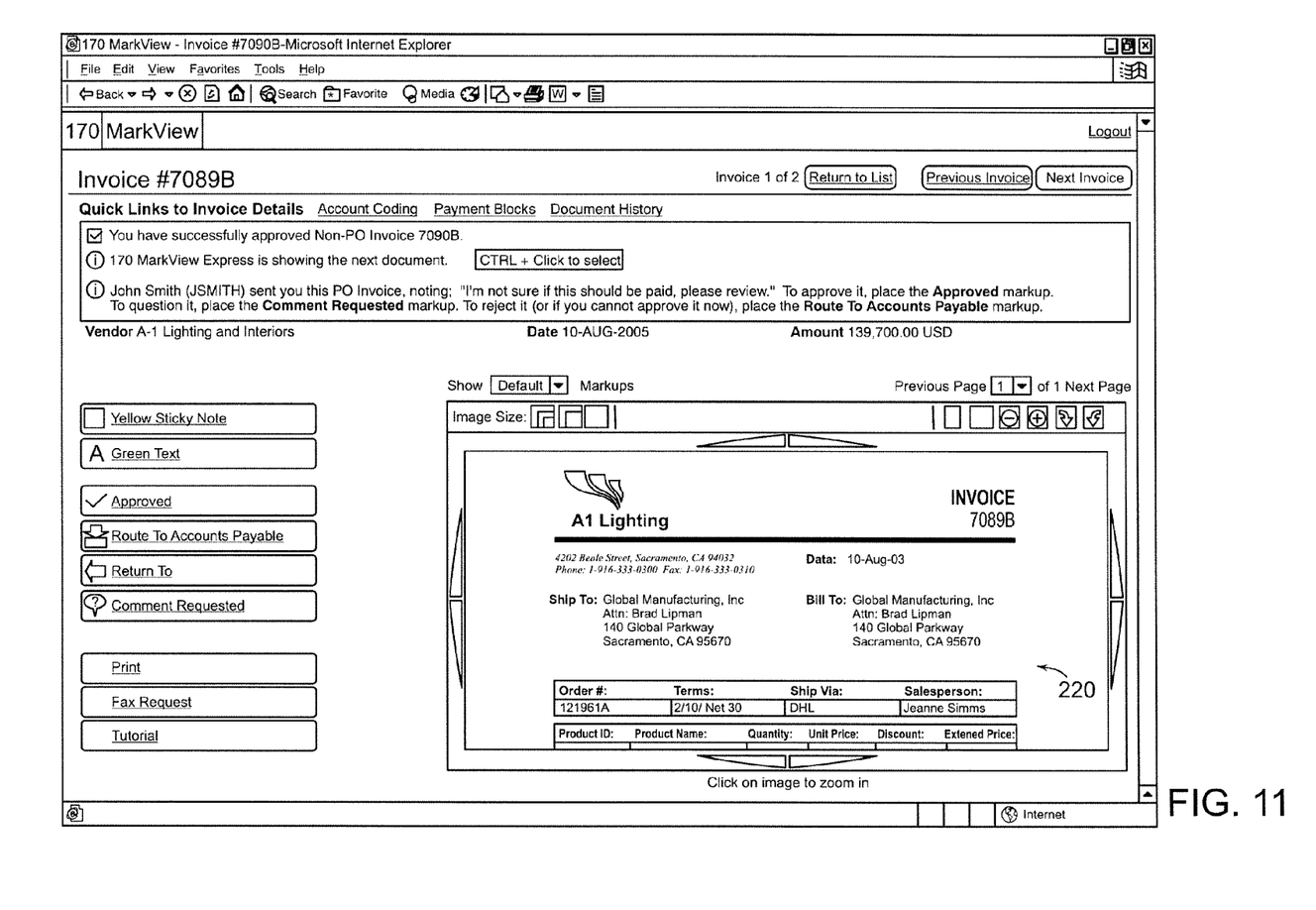

As shown in FIG. 11, the user receives confirmation of their successful action. After taking an action, in some embodiments the user is automatically presented with the next item 222 awaiting their attention.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A system for providing a graphical interface to a user, comprising:
   a server platform and an operating system and application software running thereon; and,
   a client device capable of running a standard web browser that accesses the software application on the server platform for displaying information to the user in a browser window arranged within a display area on the client device, without requiring additional software to be installed or downloaded or run on the client device and without requiring a scripting language to be enabled in the web browser on the client device, or web browser plug-ins, extensions, enabled scripting language, enabled applet support or other enabled adjunct code support;

wherein the application simultaneously provides structured information within the browser window, and business document images within a limited portion of the browser window, and the application conditionally provides context-dependent information within the display area, the context-dependent information originating from an source external to the system;

wherein the application software
(i) facilitates manipulation by the user of unstructured business document image in the limited portion of the browser window, wherein the manipulation includes one or more operations suitable for conducting a detailed inspection of the business document image data;

(iii) facilitates the user selectively causing to display annotations within the limited portion of the browser window;

wherein the application facilitates the user inserting one or more annotations within or upon the business document image, and inserting the one or more annotations causes an action to occur in either this system or an external system;

wherein the application software facilitates the user performing context-dependent actions related to a transaction associated with at least one of the structured information and the business documents, wherein the application prompts the user for context-dependent information related to the actions, wherein validates information provided by the user with respect to data provided by another system external to the computer platform, and the context-dependent actions triggers operations in one or more other systems external to the computer platform.

* * * * *